United States Patent
Lei et al.

(10) Patent No.: US 9,542,294 B2
(45) Date of Patent: Jan. 10, 2017

(54) METHOD TO APPLY PERTURBATION FOR RESOURCE BOTTLENECK DETECTION AND CAPACITY PLANNING

(71) Applicant: International Business Machines Corporation, Armonk, NY (US)

(72) Inventors: Yang Lei, Cary, NC (US); Xiaoqiao Meng, Yorktown Heights, NY (US); Jian Tan, Wappingers Falls, NY (US); Li Zhang, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 223 days.

(21) Appl. No.: 13/937,697

(22) Filed: Jul. 9, 2013

(65) Prior Publication Data

US 2015/0020076 A1    Jan. 15, 2015

(51) Int. Cl.
  *G06F 9/50*   (2006.01)
  *G06F 11/34*  (2006.01)

(52) U.S. Cl.
  CPC ............ *G06F 11/3447* (2013.01); *G06F 9/50* (2013.01); *G06F 9/5061* (2013.01); *G06F 11/3442* (2013.01); *G06F 11/3409* (2013.01)

(58) Field of Classification Search
  CPC .................................................. G06F 11/3447
  USPC ........................................................ 718/104
  See application file for complete search history.

(56) References Cited

U.S. PATENT DOCUMENTS

| | | | |
|---|---|---|---|
| 6,101,460 A | 8/2000 | Brinkerhoff et al. | |
| 7,660,884 B2 | 2/2010 | Pu | |
| 7,693,982 B2 | 4/2010 | Goldszmidt et al. | |
| 8,032,875 B2 | 10/2011 | Kosche et al. | |
| 8,078,255 B2 | 12/2011 | Bhandarkar et al. | |
| 8,205,014 B2 | 6/2012 | Onuki | |
| 2005/0071842 A1 | 3/2005 | Shastry | |
| 2008/0022282 A1* | 1/2008 | Cherkasova et al. | 718/102 |
| 2008/0222288 A1 | 9/2008 | Rodriguez | |
| 2009/0235268 A1* | 9/2009 | Seidman | G06F 11/3442 718/104 |
| 2009/0300173 A1 | 12/2009 | Bakman et al. | |
| 2010/0180255 A1* | 7/2010 | Chung et al. | 717/110 |
| 2011/0239220 A1* | 9/2011 | Gibson et al. | 718/103 |
| 2012/0173709 A1 | 7/2012 | Li et al. | |
| 2013/0174149 A1* | 7/2013 | Dasgupta et al. | 718/1 |

(Continued)

FOREIGN PATENT DOCUMENTS

EP    1013049 B1    6/2000

OTHER PUBLICATIONS

Simon, G, Simple Linear Regression, 2004, NYU course note for use in course B01.1305.*

(Continued)

*Primary Examiner* — Emerson Puente
*Assistant Examiner* — Charlie Sun
(74) *Attorney, Agent, or Firm* — Scully, Scott, Murphy & Presser, P.C.; Kevin Jordan

(57) ABSTRACT

Inducing perturbation by varying a supply amount of the resource type in the system and measuring performance of the software entity at multiple variation levels of the supply amount of the resource type in the system. A model may be built that characterizes a relationship between the measured performance and the variation levels. The model may be applied to detect the resource bottleneck. The model may be also applied for capacity planning.

9 Claims, 7 Drawing Sheets

(56) References Cited

U.S. PATENT DOCUMENTS

| | | | |
|---|---|---|---|
| 2014/0282425 A1* | 9/2014 | Zhao | G06F 11/3688 717/127 |
| 2014/0289733 A1* | 9/2014 | Fritz et al. | 718/104 |
| 2014/0351412 A1* | 11/2014 | Elisha | G06F 9/45533 709/224 |

OTHER PUBLICATIONS

Spall, James C. "An overview of the simultaneous perturbation method for efficient optimization." Johns Hopkins apl technical digest 19.4 (1998): 482-492.*

Gee, Jeffrey D., et al. "Cache performance of the SPEC92 benchmark suite." Micro, IEEE 13.4 (1993): 17-27.*

Martin, CIS 371 Computer Organization and Design, 2009.*

Barham et al., Using Magpie for request extraction and workload modelling, USENIX Association OSDI '04: 6th Symposium on Operating Systems Design and Implementation, Oct. 2004, pp. 259-272.

Gmach et al., Capacity Management and Demand Prediction for Next Generation Data Centers, Jul. 2007, pp. 43-50.

Hardwick et al., Modeling the Performance of E-Commerce Sites, 27th International Conference of the Computer Measurement Group. Published as Journal of Computer Resource Management, 105:3(12), Jan. 2001 pp. 3-12.

Govindan et al., Statistical Profiling-based Techniques for Effective Power Provisioning in Data Centers EuroSys'09, Apr. 1-3, 2009, pp. 317-330, Nuremberg, Germany. Copyright 2009 ACM 978-1-60558-482-9/09/04.

Barham et al., Magpie: online modelling and performance-aware systems, Proceedings of HotOS IX: The 9th Workshop on Hot Topics in Operating Systems, May 18-21, 2003, pp. 85-90.

Bennani et al., Resource Allocation for Autonomic Data Centers using Analytic Performance Models, 2005 IEEE Intl'. Conf. on Autonomic Computing, Seattle, Washington, Jun. 13-16, 2005, pp. 229-240.

Kalyvianaki et al., Self-Adaptive and Self-Configured CPU Resource Provisioning for Virtualized Servers Using Kalman Filters, ICAC'09, Jun. 15-19, 2009, pp. 117-126, Barcelona, Spain. Copyright 2009 ACM 978-1-60558-564-2/09/06.

Chen et al., Pinpoint: Problem Determination in Large, Dynamic Internet Services, DSN '02 Proceedings of the 2002 International Conference on Dependable Systems and Networks, Jun. 23-26, 2002, pp. 595-604.

Bates, Debugging Heterogeneous Distributed Systems Using Event-Based Models of Behavior, ACM Transactions on Computer Systems (TOCS) TOCS Homepage archive, vol. 13 Issue 1, Feb. 1995, pp. 1-31.

Choi et al., Profiling, Prediction, and Capping of Power Consumption in Consolidated Environments, In Proceedings of IEEE Mascots, Baltimore, MD, Sep. 2008, pp. 1-10.

Urgaonkar et al., Resource Overbooking and Application Profiling in Shared Hosting Platforms, CM SIGOPS Operating Systems Review—OSDI '02: Proceedings of the 5th symposium on Operating systems design and implementation, vol. 36 Issue SI, Dec. 2002, pp. 239-254.

Wood et al., Profiling and Modeling Resource Usage of Virtualized Applications, Middleware 2008, Lecture Notes in Computer Science vol. 5346, Dec. 2008, pp. 366-387.

Cecchet et al., "Performance Debugging in Data Centers: Doing More with Less" Communication Systems and Networks and Workshops, COMSNETS 2009, Jan. 5-10, 2009, pp. 1-9.

Kang et al., "DAPA: Diagnosing Application Performance Anomalies for Virtualized Infrastructures," USENIX Hot-ICE, Apr. 25-27, 2012, pp. 1-6.

Khanna et al., "Distributed Diagnosis of Failures in a Three Tier E-Commerce System," 26th IEEE International Symposium on Reliable Distributed Systems, 2007, 185-198.

Power, "Design and use of a program execution analyzer," IBM Systems Journal, vol. 22, No. 3, 1983, pp. 271-294.

Dube, P., et al., "Identification and approximations for systems with multi-stage workflows", Simulation Confierence (WSC), Proceedings of the 2011 Winter, Dec. 11-14, 2011, pp. 3273-3282.

Office Action dated Oct. 7, 2015 received in U.S. Appl. No. 14/134,833.

Office Action dated Apr. 22, 2016 received in U.S. Appl. No. 13/970,160, 36 pages.

Office Action dated Mar. 24, 2016 received in U.S. Appl. No. 14/134,833, 18 pages.

* cited by examiner

METHOD TO APPLY PERTURBATION FOR RESOURCE BOTTLENECK DETECTION AND CAPACITY PLANNING

FIELD

The present application relates generally to computers, and computer applications, and more particularly to bottleneck detection and capacity planning in computing systems.

BACKGROUND

Software performance depends on allocated resources. For instance, when software runs in a computer system, whether it is a centralized or a distributed system, the software performance depends on how much of computing resources is being allocated. Computer resources may include physical resources as well as virtual resources. Examples of physical resources, e.g., may include a processor (central processing unit (CPU) or CPU cycles), memory, internal Input/Output (disk I/O) and external I/O (networking bandwidth). Examples of virtual resources may include thread pool size, buffer size and others.

Existing approaches that try to understand a component's performance may require experts with deep understanding on the software structure, i.e., how to break the software into individual components, and how the end-to-end performance is derived from the component-level performance. Such approaches may also require adding instrumenting code to the software source code which may be difficult in many situations. Further such approaches may be highly software-specific, and cannot be easily generalized.

Another known approach may intercept the targeted software. The drawback of this approach lies in the difficulty for designing the intercept. It also requires the knowledge of the APIs for all the low-level resource usage that the software is calling, which presents a difficult practice. In addition, the large overhead created by such monitoring layer or intercept may significantly affect the software performance such that the collected performance numbers are not representative. Other approaches may passively collect observed data for performance related information, but with such approaches the effectiveness may highly depend on the observed data only.

BRIEF SUMMARY

A method of detecting resource bottleneck of a software entity, in one aspect, may comprise identifying a resource type in a system executing the software entity. The method may also comprise intentionally inducing perturbation by varying the supply amount of the resource type in the system. The method may further comprise measuring performance of the software entity at multiple variation levels of the supply amount of the resource type in the system. The method may also comprise modeling a relationship between the measured performance and the variation levels. The method may further comprise applying the model to detect the resource bottleneck.

A system for detecting resource bottleneck of a software entity, in one aspect, may comprise a module operable to execute on the processor and further operable to identify a resource type in a system executing the software entity, the module further operable to intentionally induce perturbation by varying the supply amount of the resource type in the system. The module may be further operable to measure performance of the software entity at multiple variation levels of the supply amount of the resource type in the system. The module may be further operable to model a relationship between the measured performance and the variation levels. The system may also comprise a bottleneck detector operable to apply the model to detect the resource bottleneck.

A computer readable storage medium storing a program of instructions executable by a machine to perform one or more methods described herein also may be provided.

Further features as well as the structure and operation of various embodiments are described in detail below with reference to the accompanying drawings. In the drawings, like reference numbers indicate identical or functionally similar elements.

DETAILED DESCRIPTION

Figure 1:
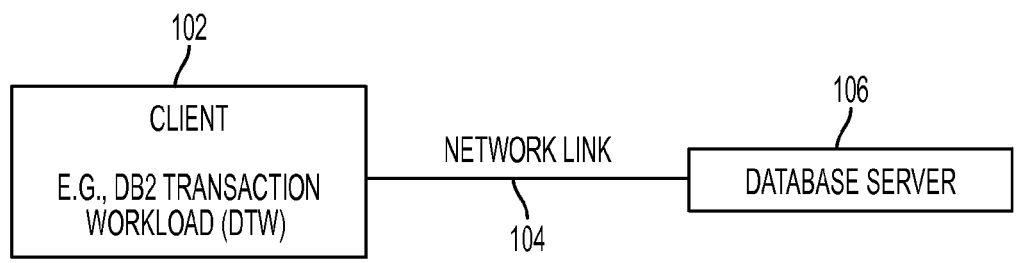
FIG. 1 is a diagram illustrating an example scenario in one embodiment of the present disclosure.

Detecting resource bottleneck and planning capacity are two closely relevant issues and can usually be solved simultaneously. Bottleneck detection refers to identifying the resource type(s) that restrains or prevents the system performance from improving, even with an increase of the other types of resources. The bottleneck resources could be a single type or a combination of multiple types. Capacity planning refers to determining how much performance gain should be expected, if an extra amount of bottleneck resources that combat bottleneck are added. For instance, a frequently occurring problem is how to detect which resource is the bottleneck that limits the software performance. Another relevant problem is, if one resource type is detected as the bottleneck and an extra amount of the resource is added to combat the detected bottleneck, determining how much performance gain can be expected. Such a two-stage problem in the present disclosure is called resource bottleneck detection and capacity planning. It is a general problem, applied to not only software applications, but also operating system, virtual machines and others. Bottleneck detection and capacity planning are useful in a wide range of scenarios. For instance, bottleneck detection may be needed for debugging software performance and scaling up. Capacity planning may be often needed for estimating the Return-of-investment (ROI) or cloud resource.

In one embodiment of the present disclosure, resource bottleneck detection and capacity planning is provided. The resource bottleneck detection and capacity planning of the present disclosure in one embodiment is general enough to be applicable to many scenarios and applications. The effectiveness of resource bottleneck detection and capacity planning of the present disclosure in one embodiment does not depend on data that are passively observed.

A methodology in one embodiment of the present disclosure may induce positive or negative perturbation to a resource supply by imposing various or varying perturbation levels. In this way, one can observe how an end-to-end performance changes based on the varying perturbation levels. The methodology of the present disclosure in one embodiment may model the relationship between the performance measure and the perturbation level. The model can be used to predict performance improvement/degradation whenever the resource supply is increased or decreased.

For example, targeted software uses a portion of a system resource and its performance is correlated to the resource supply. The resource supply may be perturbed and how the targeted software's performance reacts may be modeled. The derived model reflects how the perturbation impacts the performance. By carefully designing the perturbation experiment, specifically, selecting the resource types that are perturbed, and determining the amount of resources changed by the perturbation, the methodology of the present disclosure in one embodiment may compare and find out which resource has the most significant impact on the software performance; such a resource could be identified as the bottleneck. There could be more than one resource identified as the bottlenecks.

The methodology of the present disclosure in one embodiment need not require expert knowledge on the system or software, or another whose performance is impacted, and hence may be easy to adapt. In addition, the methodology of the present disclosure in one embodiment is very general in that the method may be applicable to a broad spectrum of scenarios, including e.g., software on a single system, distributed software on a distributed systems, virtual machines deployed on physical machines. The perturbation described in the present embodiment may perturb the aggregate resource supply, that is, the resource provided for the entire system instead of for individual software components. This makes the perturbation very practical. For instance, if the resource type is a CPU, the perturbation can be conducted by varying the number of enabled CPU cores before the system bootup, e.g., rather than controlling the CPU cycles allocated to individual running processes. As another example, if the concerned resource is memory size, the aggregate resource supply is the total physical memory available for the OS (Operating System). In this case, perturbing the aggregate resource supply can be realized by adding a kernel boot parameter to specify the maximum available physical memory (for Linux environments). The methodology of the present disclosure in one embodiment is not limited to those fundamental physical resources such as CPU, I/O, network bandwidth and memory. Rather, the methodology of the present disclosure in one embodiment is applicable to any virtual or scenario-specific resources, e.g., virtual memory size, thread pool size, and others. In one aspect, the methodology of the present disclosure utilizes a way to control the supplied resource amount.

FIG. 1 is a diagram illustrating an example scenario in one embodiment of the present disclosure. This scenario illustrates a DB2 Transaction Workload (DTW), in which a client 102 runs transactions. Each transaction contains one or multiple database queries that pass through a network link 104 between the client 102 and the database server 106. The application performance in this scenario is often measured by the transactions-per-second (TPS) and transaction response time. In this scenario, assuming the network link 104 is 1 Gbps Ethernet, one may want to know: if the Ethernet link is replaced by a high-performance fabric, e.g., 40 Gbps InfiniBand fabric, how much will the application performance be improved? Replacing the hardware to answer such questions is often cumbersome in practice. A methodology of the present disclosure may be applied to answer these questions in a more convenient manner.

Figure 2:
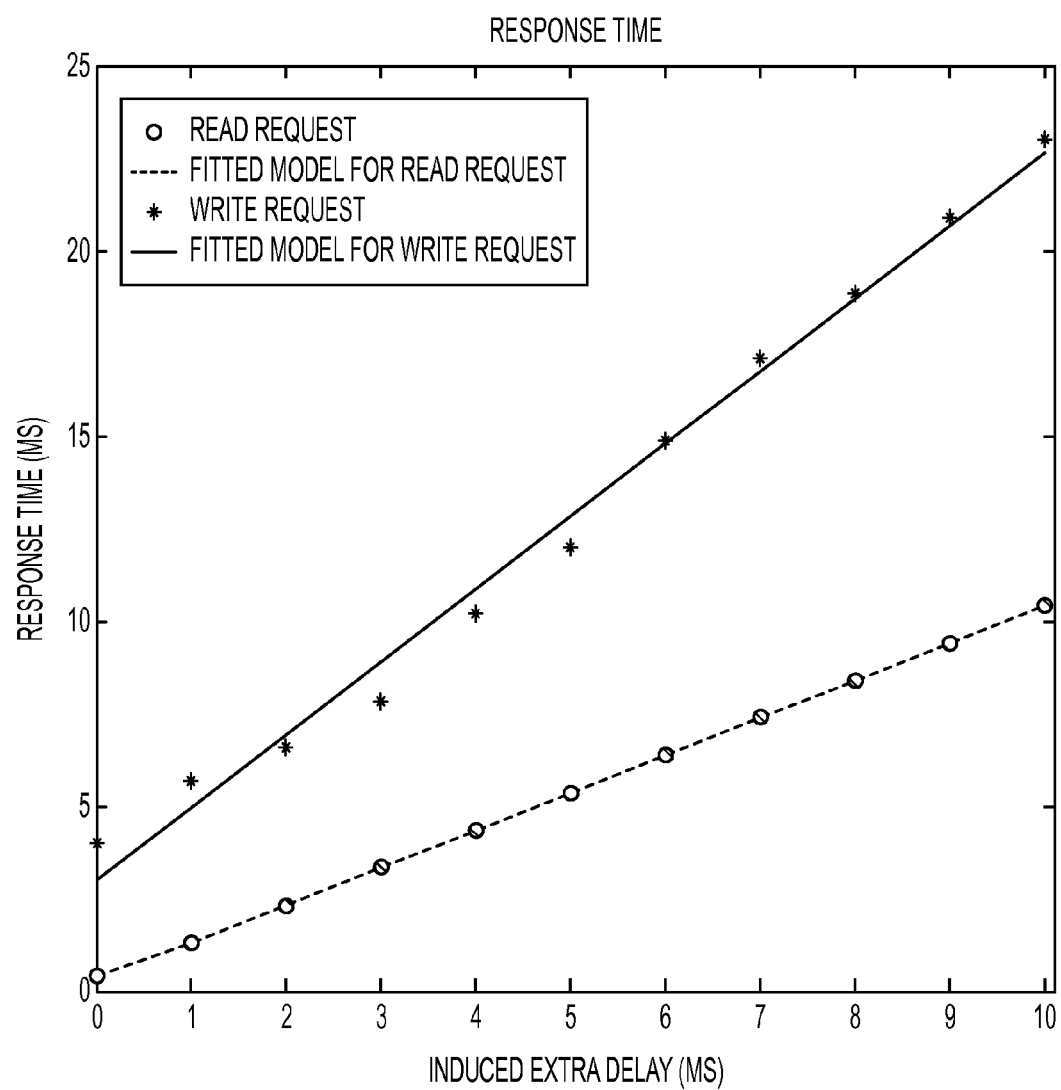
FIG. 2 shows example performance data points measured during perturbing of a resource supply in one embodiment of the present disclosure.

For example, the methodology of the present disclosure in one embodiment may emulate a slower link by adding a packet delay to each outgoing packet on the database server 106. The introduced extra delay is the perturbation in this example. The methodology of the present disclosure in one embodiment may then measure the application performance by running the DTW for a sufficient period of time. By testing a set of extra delays, the methodology of the present disclosure in one embodiment may model how the performance (e.g., request response time) changes with respect to the extra packet delay. FIG. 2 shows an example relationship between performance measure and perturbation level, in this example, relationship between the request response time vs. added packet delay. It shows the response time degrading when injected packet delay becomes larger. Specifically, if the extra packet delay is x milliseconds, the response time of Read request increases by x, and the response time of Write request increases by 2x. The reason for such a difference is that a Write request here involves two round-trip over the network link. The first round-trip is to transfer queries to the database, and the second round-trip is to commit the Write. A Read request does not require the commit phase, thus it is only one round-trip. A modeled relationship may be in a form of an equation or formula.

The measured data points may be used to estimate how much the response time will reduce if the 1 Gbps Ethernet link is replaced by a faster fabric. Because replacing the link by a faster fabric is equivalent to injecting a negative extra packet delay, the relationship shown in FIG. 2 may be used to project the response time for a negative extra packet delay. The data points plotted in FIG. 2 may be used to build a model that fits the measured points. In this case, a linear regression model (represented by the dotted line) works. Then using this fitted regression model, it is possible to determine the response time for a given negative extra packet delay.

Figure 3:
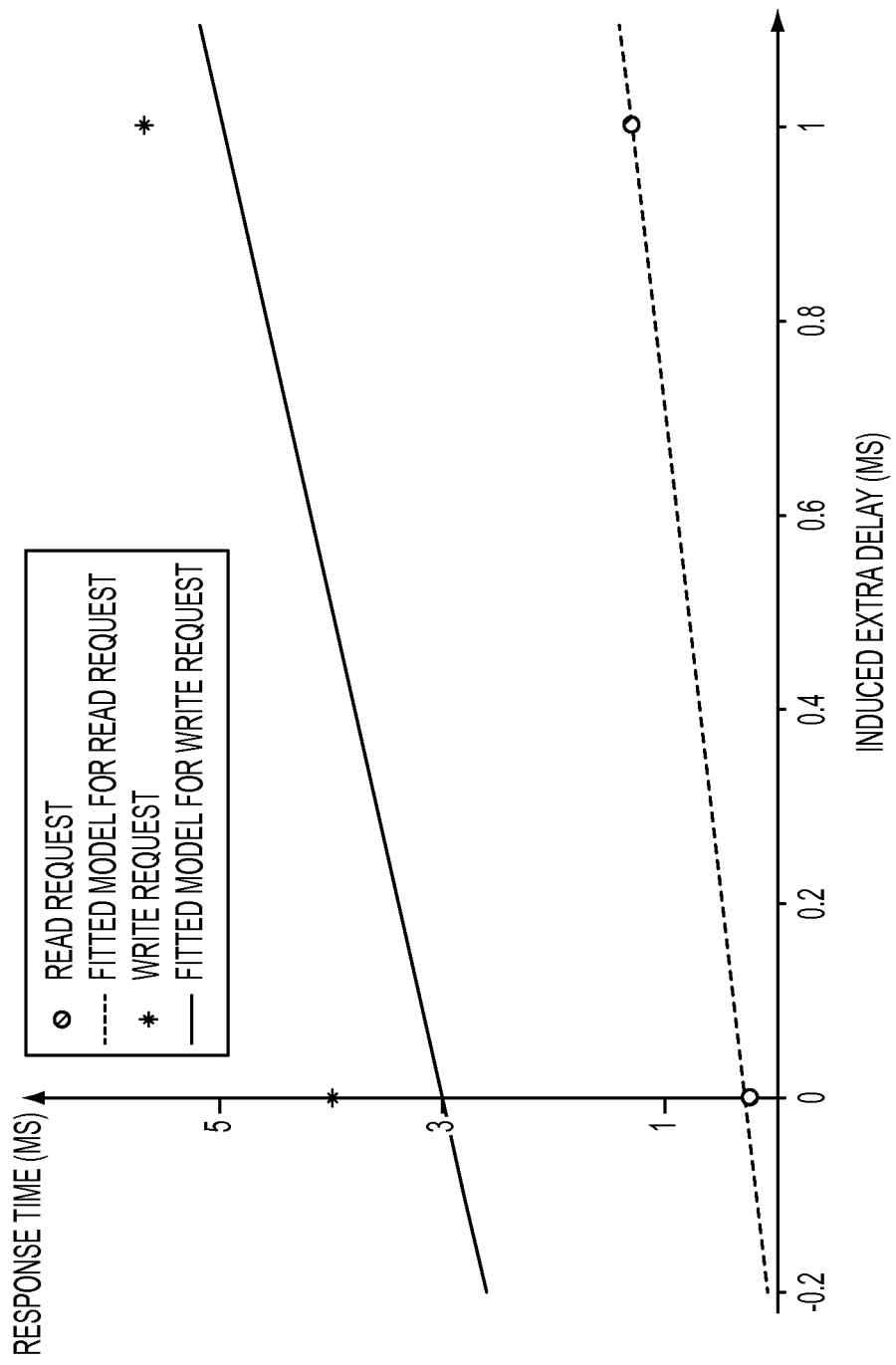
FIG. 3 is a zoom-in snapshot of the measurement shown in FIG. 2.

FIG. 3 is a zoom-in snapshot for a negative extra delay up to −0.2 millisecond. If replacing the 1 Gbps Ethernet link by a 40 Gbps InfiniBand link will reduce link latency from 100 us to 10 us, by applying the fitted regression model, it can be determined that the response time for Read request will decrease by 90 us, and the response time for Write request will decrease by 180 us. The same method can be applied here to estimate the increase of transactions-per-second (TPS) if making the network fabric upgrade.

Figure 4:
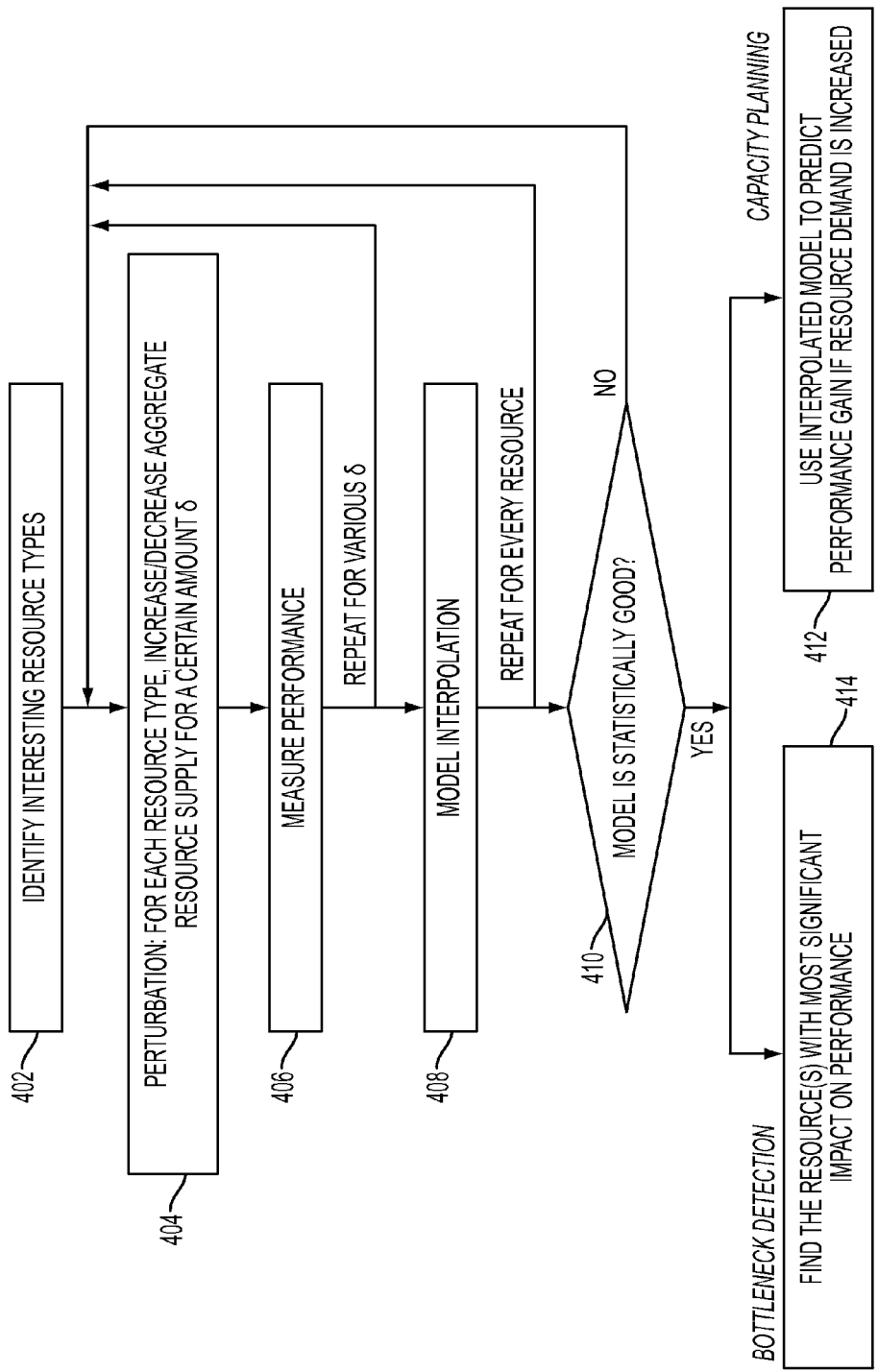
FIG. 4 is a flow diagram illustrating a method of the present disclosure in one embodiment.

FIG. 4 is a flow diagram illustrating a method of the present disclosure in one embodiment. A method in one embodiment may model the dependency of a component's performance (e.g., software performance, computing system performance, other performance) with respect to the amount of total available resource. The method may induce variations to the available amount of resources. In one embodiment of the present disclosure, the variation is for the aggregate resource amount, rather than the resource allocated to individual application. It may be infeasible to control the amount of resources allocated to an individual application. Resource unit may vary for different resource types. e.g., for CPU, the resource unit could be the number of CPU cycles or the number of CPU cores. For memory, the resource unit could be bytes. For network bandwidth, the resource unit could be transmission rate (bytes per second). While the variations are being induced to the aggregate resource supply, the performance (e.g., software performance) is measured. Such a controlled perturbation experiment may be repeated multiple times in order to obtain statistically stable measurement numbers. By gradually varying the aggregate resource supply, the method of the present disclosure in one embodiment can collect a set of points regarding the aggregate resource supply and the corresponding performance.

Referring to FIG. 4, interesting resource types are identified 402. For example, those resources to be perturbed are identified. Resource type refers to the type of resources. Examples of resource types may include: CPU, memory, I/O, storage, network bandwidth, etc. Resource refers to the required elements for executing any computational tasks. CPU, memory, I/O are all resources. Aggregate resource refers to the resource provided for the entire system instead of for individual software components. Total available resource refers to the remaining amount of resources that are still available for the OS to allocate to individual applications.

At 404, for each resource type, the aggregate resource supply for that resource is varied by a determined delta amount. That is, variation is induced in the supply amount of the resource. The delta amount or variation gradient may be determined based on the characteristic or property of the resource and/or software or component whose performance is being measured.

Introducing perturbation to a system resource supply may be realized in different ways. In one embodiment, the different ways of inducing perturbation to system resources may depend on the platform and resource type. The following examples illustrate a few scenarios, however, the methodology of the present disclosure is not limited only to those examples. For example, perturbation may be introduced in CPU related resources, for instance, by using CPU frequency scaling to reduce the CPU processing speed. If a multi-core CPU is used and the resource in concern is CPU cores, perturbation may be introduced by adding a parameter in the OS booting configuration to disable one or more cores. As another example, perturbation may be induced in memory related resources. For instance, the physical memory size for a computer can be made partially usable in operating system (OS) booting configurations. As yet another example, networking I/O related resources may be perturbed or varied. For instance, available network bandwidth can be controlled by traffic rate controller, which usually can be found in a quality of service (QoS) module of most modern operating systems. Network latency can be purposely increased by tools such as netem in LINUX. Still yet as another example, disk I/O related resource may be perturbed or varied. For instance, on UNIX-like systems, disk I/O may be perturbed by tools such as ionice, which sets the I/O scheduling class and priority for a program or script. One can also use rsync with an option "--bwlimit" to control I/O bandwidth. Other systems may provide similar tools or commands for varying disk I/O. Other resources that can be perturbed or varied may include, but are not limited to, any configurable resources, e.g., virtual resources such as thread pool size and file descriptors. Perturbation experiment can be performed by changing such parameters. In one aspect, the software or a component whose performance is being measured may be restarted for measuring the performance. In one aspect, when varying the total resource supply, finer-granularity variation may be applied when the variation reaches close to zero unit.

At 406, the performance is measured. The processing returns to 404, where the perturbation is varied again, and at 406 the performance is measured again with the variance in the perturbation. The processing at 404 and 406, such that performance is measured at multiple variation levels of the supply associated with the resource.

At 408, a model is built. The collected set of points (performance measure at multiple variation levels) provides the performance measure for various levels of resource supply. Based on the measure, the method may estimate the performance for a certain level of resource supply that has not been or is impossible to be experimented. In one embodiment, this may be formulated as the classical model interpolation problem: based on the output data from various experimental inputs, the output for similar input that has not been tested is predicted. Because the measured data may be subject to noise, an appropriate method may be selected and applied to solve this data interpolation problem. The interpolated model, e.g., may include parameters that allow one to compute the output for any given input. The quality of the interpolated model can be measured by various goodness of fit statistical testing such as chi-square test. In addition to classical interpolation methods such as linear regression, polynomial fitting and spline, more sophisticated machine learning techniques such as Neural Networks and Support Vector Machine can be exploited for the model interpolation. Based on the collected data, any one or more of the above techniques may be selected for building a model of the present disclosure in one embodiment. In one aspect, the method of the present disclosure may balance over-fitting with accuracy.

In one embodiment, the method of the present disclosure may apply perturbing to more than one resource simultaneously. In the embodiment where there are multiple resource types involved, the method of the present disclosure may solve a multi-dimensional model type interpolation problem. The following example is a two-dimensional model. For example, referring to the DTW scenario described with respect to FIG. 1, the method of the present disclosure in one embodiment may vary packet latency over the network link, and at the same time, use CPU frequency scaling to slow down the CPU speed on the Database server. This allows one to seek the following relationship:

Performance=f(CPU usage, packet latency), where f(.) is an empirically fitted function. Such a model is a two-dimensional model since f(.) contains two metrics. When more resource types are involved, it can be extended to a multiple-dimensional model.

The method may perform the processing at 404, 406 and 408 for more than one resource type. Hence, the method may repeat 404, 406 and 408.

At 410, it is determined whether the built model is considered statistically sound by statistical criteria such as chi-square test. If so, the model may be utilized. If not, the processing may return to 404 where another model may be built, e.g., based on different variation levels.

At 412, the built model (e.g., via model interpolation) may be applied to determine capacity planning. Capacity planning refers to predicting performance changes when the resource supply varies. Capacity planning can also refer to determining the amount of needed resources if certain Service-level-agreement (SLA) needs to be achieved. The model derived earlier can be used for the capacity planning purpose, either for single resource or multiple resources.

At 414, the method of the present disclosure may further detect which resource is the performance bottleneck, i.e., by perturbing resources and creating the model interpolation for each individual resource type. By comparing how significant the performance is affected by a slight variation of each individual resource's supply, the method of the present disclosure may determine which resource is the bottleneck. For instance, in the above DTW example scenario, one can first perturb the network latency and observe how the performance changes. If the performance is quite stable even though the network latency increased a lot, it indicates that the network latency is not the bottleneck. Consequently, one can perturb the CPU usage by using methods such as CPU frequency scaling, if the performance dramatically changes, the CPU is most likely the bottleneck; otherwise, the perturbation test should further extend to the other resource types.

Figure 5:
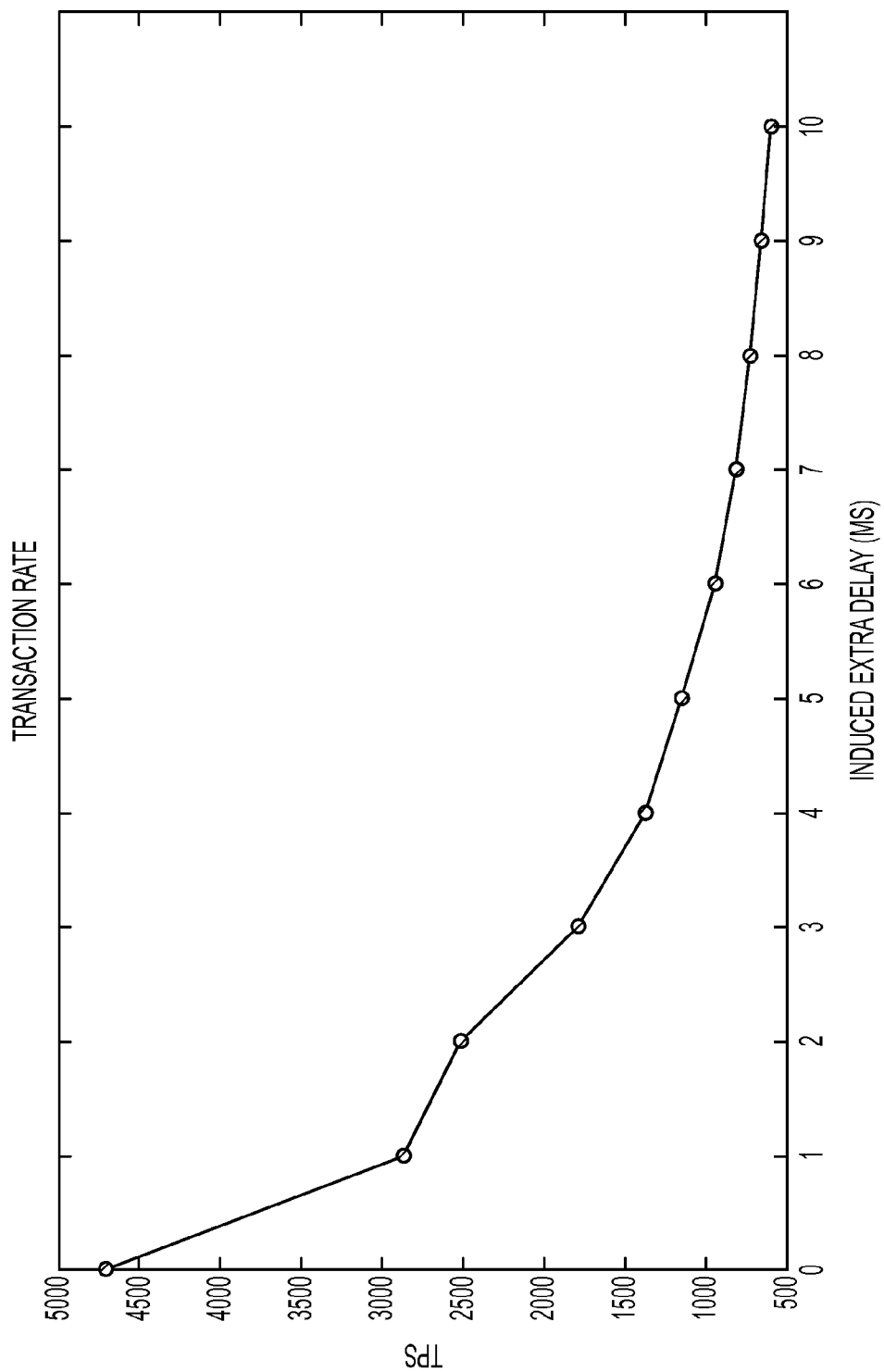
FIG. 5 illustrates throughput decreases resulting from the experiment of varying (increasing) packet latency, e.g., as described with reference to FIG. 1.

FIG. 5 illustrates DTW throughput decreases resulting from the experiment of varying (increasing) packet latency, e.g., as described with reference to FIG. 1. Throughput measured as shown in FIG. 5 may be another example of performance measure. A model may be built by fitting the data points observed. In this figure, the x-axis represents induced extra delay (milliseconds (ms)), and the y-axis represents throughput per second (tps) observed at each induced extra delay of x-axis.

Figure 6:
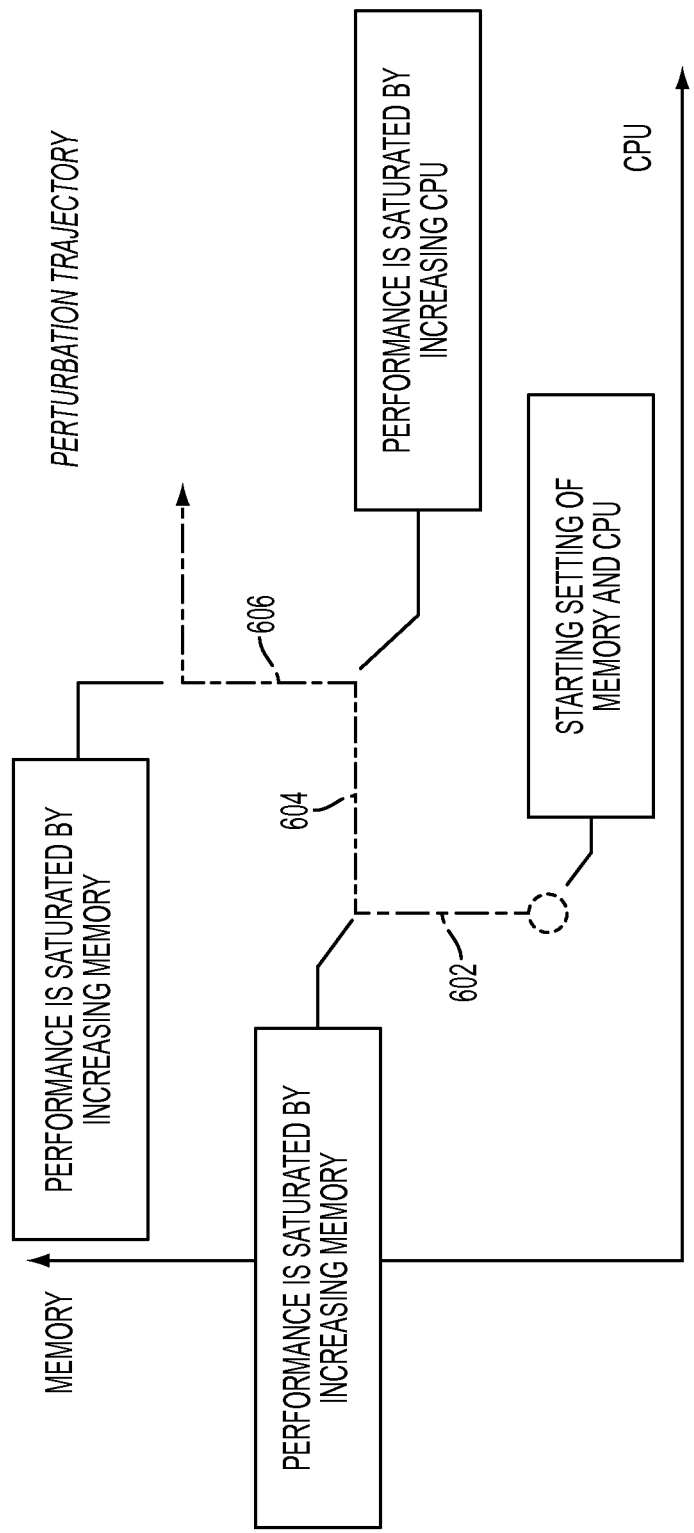
FIG. 6 illustrates a perturbation trajectory with multiple resources in one embodiment of the present disclosure.

FIG. 6 illustrates perturbation trajectory with multiple resources in one embodiment of the present disclosure. In one embodiment of the present disclosure, different resources may need to be perturbed at different stage, e.g., that follows a piecewise linear trajectory, e.g., to reduce overhead. For instance, resources most likely take turn in becoming the bottleneck. For instance, shown at 602 the supply for memory resource type may be increased with the supply for the CPU resource type staying constant, until the supply amount for memory reaches a saturation point where increasing memory does not further increase performance. Shown at 604, the supply for the CPU resource type may be increased with the supply for the memory resource type stays the same until performance is saturated (performance measure does not change between even if CPU amount changes). Again, at this CPU supply level, shown at 606, the supply amount for memory resource type may be increased until performance in saturation is reached. This type of perturbation trajectory may continue.

In one embodiment of the present disclosure, a user interface such as a graphical user interface may be provided for providing to a user one or more outputs from the above described methodologies, e.g., the modeled relationship and data analysis.

Figure 7:
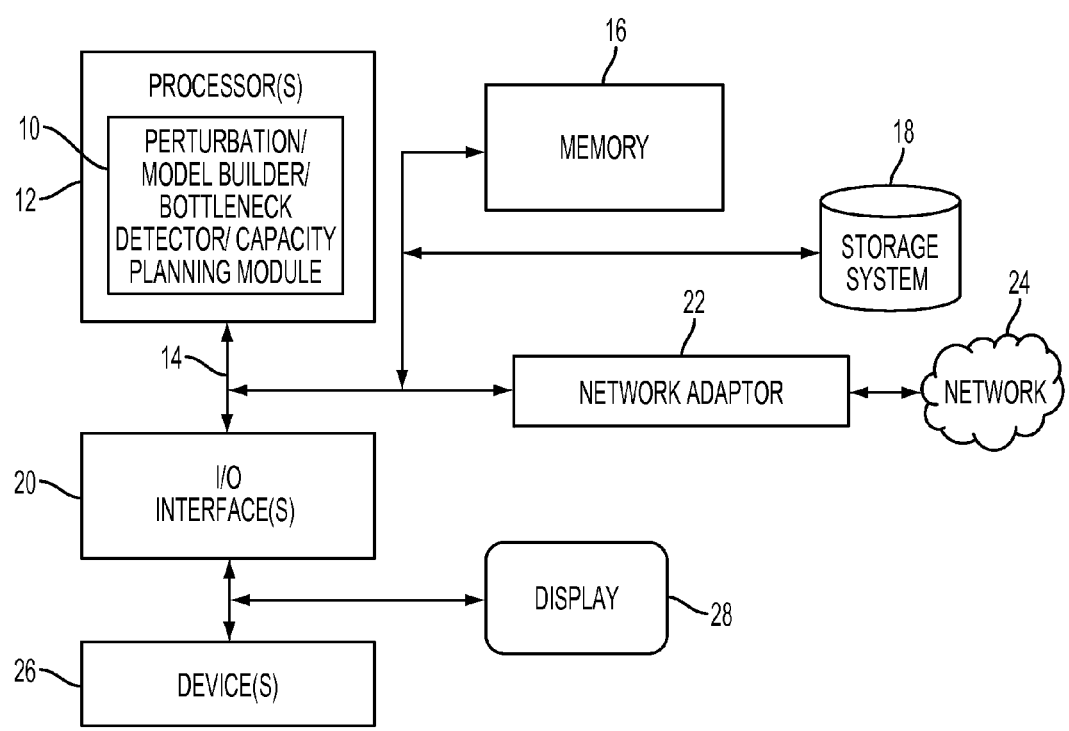
FIG. 7 illustrates a schematic of an example computer or processing system that may implement a system in one embodiment of the present disclosure.

FIG. 7 illustrates a schematic of an example computer or processing system that may implement the detection system in one embodiment of the present disclosure. The computer system is only one example of a suitable processing system and is not intended to suggest any limitation as to the scope of use or functionality of embodiments of the methodology described herein. The processing system shown may be operational with numerous other general purpose or special purpose computing system environments or configurations. Examples of well-known computing systems, environments, and/or configurations that may be suitable for use with the processing system shown in FIG. 7 may include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

The computer system may be described in the general context of computer system executable instructions, such as program modules, being executed by a computer system. Generally, program modules may include routines, programs, objects, components, logic, data structures, and so on that perform particular tasks or implement particular abstract data types. The computer system may be practiced in distributed cloud computing environments where tasks are performed by remote processing devices that are linked through a communications network. In a distributed cloud computing environment, program modules may be located in both local and remote computer system storage media including memory storage devices.

The components of computer system may include, but are not limited to, one or more processors or processing units 12, a system memory 16, and a bus 14 that couples various system components including system memory 16 to processor 12. The processor 12 may include a module 10 that performs the methods described herein. The module 10 may be programmed into the integrated circuits of the processor 12, or loaded from memory 16, storage device 18, or network 24 or combinations thereof.

Bus 14 may represent one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system may include a variety of computer system readable media. Such media may be any available media that is accessible by computer system, and it may include both volatile and non-volatile media, removable and non-removable media.

System memory 16 can include computer system readable media in the form of volatile memory, such as random access memory (RAM) and/or cache memory or others. Computer system may further include other removable/non-removable, volatile/non-volatile computer system storage media. By way of example only, storage system 18 can be provided for reading from and writing to a non-removable, non-volatile magnetic media (e.g., a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 14 by one or more data media interfaces.

Computer system may also communicate with one or more external devices 26 such as a keyboard, a pointing device, a display 28, etc.; one or more devices that enable a user to interact with computer system; and/or any devices (e.g., network card, modem, etc.) that enable computer system to communicate with one or more other computing devices. Such communication can occur via Input/Output (I/O) interfaces 20.

Still yet, computer system can communicate with one or more networks 24 such as a local area network (LAN), a general wide area network (WAN), and/or a public network (e.g., the Internet) via network adapter 22. As depicted, network adapter 22 communicates with the other components of computer system via bus 14. It should be understood that although not shown, other hardware and/or software components could be used in conjunction with computer system. Examples include, but are not limited to: microcode, device drivers, redundant processing units, external disk drive arrays, RAID systems, tape drives, and data archival storage systems, etc.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages, a scripting language such as Perl, VBS or similar languages, and/or functional languages such as Lisp and ML and logic-oriented languages such as Prolog. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The computer program product may comprise all the respective features enabling the implementation of the methodology described herein, and which—when loaded in a computer system—is able to carry out the methods. Computer program, software program, program, or software, in the present context means any expression, in any language, code or notation, of a set of instructions intended to cause a system having an information processing capability to perform a particular function either directly or after either or both of the following: (a) conversion to another language, code or notation; and/or (b) reproduction in a different material form.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements, if any, in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Various aspects of the present disclosure may be embodied as a program, software, or computer instructions embodied in a computer or machine usable or readable medium, which causes the computer or machine to perform the steps of the method when executed on the computer, processor, and/or machine. A program storage device readable by a machine, tangibly embodying a program of instructions executable by the machine to perform various functionalities and methods described in the present disclosure is also provided.

The system and method of the present disclosure may be implemented and run on a general-purpose computer or special-purpose computer system. The terms "computer system" and "computer network" as may be used in the present application may include a variety of combinations of fixed and/or portable computer hardware, software, peripherals, and storage devices. The computer system may include a plurality of individual components that are networked or otherwise linked to perform collaboratively, or may include one or more stand-alone components. The hardware and software components of the computer system of the present application may include and may be included within fixed and portable devices such as desktop, laptop, and/or server. A module may be a component of a device, software, program, or system that implements some "functionality", which can be embodied as software, hardware, firmware, electronic circuitry, or etc.

The embodiments described above are illustrative examples and it should not be construed that the present invention is limited to these particular embodiments. Thus, various changes and modifications may be effected by one skilled in the art without departing from the spirit or scope of the invention as defined in the appended claims.

We claim:

1. A method of detecting resource bottleneck of a software entity, comprising:
   identifying a resource type from multiple resource types in a system that is used while executing the software entity;
   intentionally inducing perturbation from multiple perturbations that vary the supply amount of the resource type in the system;
   measuring performance of the software entity at multiple variation levels of the supply amount of the resource type in the system; modeling a relationship between the measured performance and the variation levels; and
   applying the model to detect the resource bottleneck,
   wherein the perturbation comprises adding a packet delay to a set of outgoing packets in a network and at least one of reducing a processor speed, disabling one or more cores in a multi-core processor, increasing network latency, setting an input/output scheduling class and priority, controlling input/output bandwidth,
   wherein the identifying comprises identifying the multiple resource types, and the intentionally inducing comprises intentionally inducing the multiple perturbations to the multiple resource types simultaneously, wherein the model comprises a multi-dimensional model that incorporates the multiple resource types that are perturbed simultaneously; and
   determining a response time of a candidate network without replacing a link in the network by executing the model with a negative extra packet delay, wherein the candidate network is faster than the network;
   scaling up the system using information from the detected resource bottleneck.

2. The method of claim 1, wherein the identifying comprises identifying the multiple resource types, and the intentionally inducing of the perturbation, the measuring of the performance and modeling of the relationship are performed for a single or more than one resource types from the multiple resource types.

3. The method of claim 2, the applying of the model comprises determining a resource type that has most impact on the performance, the impact measured by comparing variation of the performance with variation of the resource supply amount.

4. The method of claim 1, further comprising applying the modeled relationship for capacity planning.

5. The method of claim 4, wherein the applying the modeled relationship for the capacity planning comprises projecting performance change in response to increasing the supply amount of the resource type.

6. The method of claim 4, wherein the applying the modeled relationship for capacity planning comprises predicting the supply amount of the resource types for a given service-level-agreement.

7. The method of claim 1, wherein the modeling of the relationship is performed by an interpolation technique which characterizes the relationship by empirically fitting a model.

8. The method of claim 1, wherein the software entity comprises software applications, virtual machines, or combinations thereof.

9. The method of claim 1, wherein the intentionally inducing perturbation, comprises at least varying aggregate supply amount of the resource type in the system.

* * * * *